Patented Feb. 16, 1932                                                        1,845,751

UNITED STATES PATENT OFFICE

ALPHONS O. JAEGER, OF MOUNT LEBANON, AND HERBERT J. WEST, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF KETO ACIDS

No Drawing.    Application filed October 26, 1929.  Serial No. 402,791.

This invention relates to the purification of keto acids and more particularly to the purification of keto acids prepared by the Friedel-Crafts reaction from dibasic acids and hydrocarbons or their derivatives.

A long series of keto acids have been prepared in the past by the Friedel-Crafts reaction from dibasic acid anhydrides, such as phthalic anhydride, maleic anhydride, succinic anhydride, and the like, condensing with hydrocarbons, particularly aromatic hydrocarbons, such as benzene, naphthalene, hydrogenated naphthalenes and their homologues and substitution products, acenaphthenes, anthracenes, fluorenes and similar polynuclear aromatic hydrocarbons and their substitution products, using aluminum chloride as a condensing agent. These acids when prepared are contaminated with considerable amounts of impurities, frequently dark-colored impurities, the amount of which appears to increase with the size of the molecules of the reacting components. Impurities are also introduced when the raw materials themselves are not pure, and in many cases technical grades of raw material are considerably cheaper than chemically pure products and it is desirable to be able to use them. The purification of keto acids in the past has required long and in many cases relatively expensive purification treatment which has increased their cost and restricted their field of utility, especially when esters are prepared which are excellent plasticizers and which, of course, normally must be colorless or light colored.

According to the present invention the complicated methods of purification which have hitherto been necessary are avoided, and keto acids are purified simply and cheaply by forming a salt of the acid with a metal and preferably with an alkali metal and then subjecting the salt so formed in the presence of an excess of alkali with an oxidizing agent which will destroy the impurities, especially the dark-colored impurities, but will not notably attack the keto acids themselves. We have found that hypohalites, either in the preformed or nascent state, are very effective, as are permanganates, but other oxidizing agents may be used which are effective in alkaline solution and which are not strong enough to attack the acids themselves.

The invention will be described more particularly in the following specific examples which illustrate the application of the invention to two typical ketonic acids. It should be understood that the invention is applicable generally to all ketonic acids, the examples merely giving representative members.

Example 1

1 part of crude phthalic anhydride is added to a suspension of 2 parts of anhydrous aluminum chloride in 4-6 parts of commercial benzene. The mixture is heated at 45° C. for one hour, the temperature raised to 75° C., and the heating continued for another hour. The mixture is then poured into a boiling solution of sodium carbonate, there being a slight excess of carbonate over the theoretical amount to form the sodium salt of benzoylbenzoic acid and to precipitate the aluminum as the hydroxide. The benzene is distilled off from the mixture and $\frac{1}{10}$ to 1 part of caustic soda is added and the solution cooled down to 20° C. Chlorine is passed in as long as it is absorbed. After all the chlorine has been added the solution is warmed to 70° C., filtered, and benzoylbenzoic acid precipitated from the filtrate by means of a mineral acid. If desired the aluminum hydroxide may be filtered off before the addition of the caustic soda and the chlorine, although this is normally not necessary. Instead of using caustic soda and chlorine, sodium hypochlorite may be used in equivalent amounts. The results obtained are the same.

Example 2

1 part of crude phthalic anhydride is mixed with 1.3 parts of naphthalene and 3 parts of commercial benzene. 2 parts of anhydrous aluminum chloride are added and the mixture is slowly heated to 75° C. After reaction is complete, the mixture is poured into 30-40 parts of an alkali metal carbonate solution containing sufficient alkali to give an alkaline reaction when the dilution is completed. The mixture is then steam distilled to remove the benzene and unchanged naphthalene. $\frac{1}{10}$ to ½ part of potassium permanganate is added and the mixture boiled to completely destroy the impurities. After boiling is completed the aluminum hydroxide and any precipitated manganese dioxide is filtered off, and purified alpha naphthoyl benzoic acid is precipitated from the filtrate by acidifying with a mineral acid, followed by filtration and washing free from unchanged potassium permanganate.

What is claimed as new is:

1. A method of purifying keto acid prepared by a Friedel-Crafts synthesis from a dibasic acid, which comprises subjecting a soluble salt of the acid to oxidation in alkaline solution with an oxidizing agent which does not substantially attack the salt of the acid but which is present in sufficient amounts to react with substantially all of the impurities, and separating the purified salt from insoluble impurities.

2. A method of purifying keto acid prepared by a Friedel-Crafts synthesis from a dibasic acid, which comprises subjecting an alkali metal salt of the acid to oxidation in alkaline solution with an oxidizing agent which does not substantially attack the salt of the acid but which is present in sufficient amounts to react with substantially all of the impurities, and separating the purified salt from insoluble impurities.

3. A method of purifying keto acids, which comprises subjecting a soluble salt of an acid prepared by a Friedel-Crafts synthesis from an aromatic dibasic acid and a compound included in the group consisting of benzene hydrocarbons, substituted benzene hydrocarbons, hydrocarbons of the naphthalene series, substituted hydrocarbons of the naphthalene series, hydrogenated naphthalene hydrocarbons, polynuclear hydrocarbons other than those of the naphthalene series, substituted polynuclear hydrocarbons other than those of the naphthalene series, to the action of an oxidizing agent in alkaline solution which is of insufficient strength to attack the salt of the acid but which is present in sufficient amount to attack substantially all of the impurities, and separating the acid salt from insoluble impurities.

4. A method of purifying keto acids, which comprises subjecting an alkali metal salt of an acid prepared by a Friedel-Crafts synthesis from an aromatic dibasic acid and a compound included in the grup consisting of benzene hydrocarbons, substituted benzene hydrocarbons, hydrocarbons of the naphthalene series, substituted hydrocarbons of the naphthalene series, hydrogenated naphthalene hydrocarbons, polynuclear hydrocarbons other than those of the naphthalene series, substituted polynuclear hydrocarbons other than those of the naphthalene series, to the action of an oxidizing agent in alkaline solution which is of insufficient strength to attack the salt of the acid but which is present in sufficient amount to attack substantially all of the impurities, and separating the acid salt from insoluble impurities.

5. A method of purifying keto acids, which comprises subjecting a soluble salt of an acid prepared by a Friedel-Crafts synthesis from a phthalic anhydride and a compound included in the group consisting of benzene hydrocarbons, substituted benzene hydrocarbons, hydrocarbons of the naphthalene series, substituted hydrocarbons of the naphthalene series, hydrogenated naphthalene hydrocarbons, polynuclear hydrocarbons other than those of the naphthalene series, substituted polynuclear hydrocarbons other than those of the naphthalene series, to the action of an oxidizing agent in alkaline solution which is of insufficient strength to attack the salt of the acid but which is present in sufficient amount to attack substantially all of the impurities, and separating the acid salt from insoluble impurities.

6. A method of purifying keto acids, which comprises subjecting an alkali metal salt of an acid prepared by a Friedel-Crafts synthesis from a phthalic anhydride and a compound included in the group consisting of benzene hydrocarbons, substituted benzene hydrocarbons, hydrocarbons of the naphthalene series, substituted hydrocarbons of the naphthalene series, hydrogenated naphthalene hydrocarbons, polynuclear hydrocarbons other than those of the naphthalene series, substituted polynuclear hydrocarbons other than those of the naphthalene series, to the action of an oxidizing agent in alkaline solution which is of insufficient strength to attack the salt of the acid but which is present in sufficient amount to attack substantially all of the impurities, and separating the acid salt from insoluble impurities.

7. A method according to claim 3, in which the oxidizing agent is a hypohalite.

8. A method according to claim 4, in which the oxidizing agent is a hypohalite.

9. A method according to claim 5, in which the oxidizing agent is a hypohalite.

10. A method according to claim 6, in which the oxidizing agent is a hypohalite.

11. A method of purifying keto acids, which comprises subjecting an alkali metal salt of a keto acid prepared by the condensation of phthalic anhydride with a compound of the group consisting of benzene hydrocarbons, substituted benzene hydrocarbons, naphthalene hydrocarbons, substituted naphthalene hydrocarbons, hydrogenated naphthalene hydrocarbons, in the presence of aluminum chloride, to the action of an oxidizing agent in an alkaline solution, which agent is not strong enough to attack the salt of acid but is strong enough to react with all the impurities, and recovering the purified acid compound from the impurities.

12. A method according to claim 11, in which the oxidizing agent is a hypohalite.

13. A method according to claim 11, in which the keto acid is a benzoylbenzoic acid.

14. A method according to claim 11, in which the keto acid is a benzoylbenzoic acid and the oxidizing agent is a hypohalite.

Signed at Pittsburgh, Pennsylvania, this 22nd day of October, 1929.

ALPHONS O. JAEGER.
HERBERT J. WEST.